US008423786B2

(12) United States Patent
Takaku et al.

(10) Patent No.: US 8,423,786 B2
(45) Date of Patent: Apr. 16, 2013

(54) BIOMETRICS AUTHENTICATION METHOD, MEDIA FOR INDIVIDUAL AUTHENTICATION, AND BIOMETRICS AUTHENTICATION DEVICE (75) Inventors: Kazuo Takaku, Inagi (JP); Yasuhiko Mita, Inagi (JP); Naoko Suzuki, Inagi (JP); Shinya Iwasaki, Inagi (JP); Masayuki Yano, Inagi (JP); Ikuo Mutou, Takasaki (JP)

(73) Assignees: Fujitsu Limited, Kawasaki (JP); Fujitsu Frontech Limited, Inagi-shi, Tokyo (JP)

( * ) Notice: Subject to any disclaimer, the term of this patent is extended or adjusted under 35 U.S.C. 154(b) by 1177 days.

(21) Appl. No.: 11/853,225

(22) Filed: Sep. 11, 2007

(65) Prior Publication Data
US 2008/0065901 A1 Mar. 13, 2008

(30) Foreign Application Priority Data

Sep. 12, 2006 (JP) ................................ 2006-246443

(51) Int. Cl.
*G06F 21/00* (2006.01)
(52) U.S. Cl.
USPC ............................................... 713/186; 726/5
(58) Field of Classification Search .................. 713/182, 713/186; 726/5
See application file for complete search history.

(56) References Cited

U.S. PATENT DOCUMENTS

| | | | |
|---|---|---|---|
| 6,657,538 B1 * | 12/2003 | Ritter | 340/5.81 |
| 7,047,418 B1 * | 5/2006 | Ferren et al. | 713/186 |
| 7,085,931 B1 * | 8/2006 | Smith et al. | 713/182 |
| 2002/0048390 A1 * | 4/2002 | Ikegami | 382/124 |
| 2004/0015702 A1 * | 1/2004 | Mercredi et al. | 713/182 |
| 2005/0144450 A1 * | 6/2005 | Voice | 713/169 |
| 2006/0050931 A1 | 3/2006 | Oka | |
| 2006/0080549 A1 * | 4/2006 | Okamura et al. | 713/186 |

FOREIGN PATENT DOCUMENTS

| | | | |
|---|---|---|---|
| GB | 2397419 A | | 7/2004 |
| GB | 2397419 | * | 11/2005 |
| JP | 2000-215280 | * | 4/2000 |
| JP | 2000-215280 A | | 8/2000 |
| JP | 2000-293643 A | | 10/2000 |
| JP | 2001-67137 A | | 3/2001 |
| JP | 2002-351843 A | | 12/2002 |
| JP | 2005-115800 A | | 4/2005 |
| JP | 2005-122478 A | | 5/2005 |
| JP | 2006-079181 A | | 3/2006 |
| KR | 10-2005-0023050 A | | 3/2005 |
| WO | 2005/098742 A2 | | 10/2005 |
| WO | WO2005098742 | * | 10/2005 |

OTHER PUBLICATIONS

Korean Office Action dated Aug. 28, 2009, issued in corresponding Korean Parent Application No. 10-2007-0090356.

(Continued)

*Primary Examiner* — Michael Pyzocha
*Assistant Examiner* — Randal Moran
(74) *Attorney, Agent, or Firm* — Westerman, Hattori, Daniels & Adrian, LLP (57) ABSTRACT

A biometrics authentication device which detects body characteristics, performs verification against registered biometrics data, and performs individual authentication, by which confidentiality is improved even when biometrics data is separated, distributed and stored. A biometrics information key is created from biometrics data detected by a detection device, the biometrics data is divided into a plurality of portions, and the portions are stored on different media. The biometrics information key is stored on one media, and at the time of authentication, the separated biometrics data portions are combined and a biometrics information key is created and is compared with the biometrics information key, to judge the linked relationship. Hence confidentiality of the association of the individual separated data portions can be improved even when the biometrics data is separated, distributed and stored, contributing to prevent illicit use resulting from leakage or theft of biometrics data.

18 Claims, 9 Drawing Sheets

OTHER PUBLICATIONS

European Search Report dated Dec. 7, 2009, issued in corresponding European Patent Application No. 07113935.6.

European Office Action dated Nov. 7, 2011, issued in corresponding European Patent Application No. 07113935.6.

Japanese Office Action dated Nov. 8, 2011, issued in corresponding Japanese Patent Application No. 2006-246443. (Partial English translation).

European Office Action dated Sep. 20, 2010, issued in corresponding European Patent Application No. 07 113 935.6.

* cited by examiner

BIOMETRICS AUTHENTICATION METHOD, MEDIA FOR INDIVIDUAL AUTHENTICATION, AND BIOMETRICS AUTHENTICATION DEVICE

CROSS-REFERENCE TO RELATED APPLICATIONS

This application is based upon and claims the benefit of priority from the prior Japanese Patent Application No. 2006-246443, filed on Sep. 12, 2006, the entire contents of which are incorporated herein by reference.

BACKGROUND OF THE INVENTION

1. Field of the Invention

This invention relates to a biometrics authentication method, media for individual authentication, and a biometrics authentication device, for authenticate an individual by utilizing biometrics characteristics which are a portion of the human body, and in particular relates to a biometrics authentication method, media for individual authentication, and a biometrics authentication device which are suitable for use in individual authentication by verifying registered biometrics data sets against a detected biometrics data set.

2. Description of the Related Art

Among individual authentication techniques of recent years, biometrics authentication technology has attracted attention. There are numerous portions of the human body which can be used to differentiate the individual, such as fingerprints and toe-prints, the retinas of the eyes, facial features, and blood vessels; in such methods, biometrics characteristics of such portions of the human body are identified to perform individual authentication.

For example, comparatively large amounts of individual characteristic data are obtained from blood vessels in the fingers, palms, and backs of the hands. Moreover, blood vessel (vein) patterns remain unchanged throughout life from infancy and are regarded as being completely unique, and so are well-suited to individual authentication.

In such biometrics authentication, first a portion of the biometrics characteristics of the user himself is detected by a detection apparatus, and the detected biometrics data is registered on a card or on a server. Next, in order to perform individual authentication, a portion of the biometrics characteristics of the user is detected by a detection apparatus, the detected biometrics data is verified against the registered biometrics data, and individual authentication is performed based on degree of similarity.

If such biometrics data is registered and stored in one location, then should the data be leaked to an outside party, there is the possibility that the entirety of the biometrics data may be copied or that some forgery or similar may occur, resulting in illicit use. Hence a distributed storage method has been proposed, in which the biometrics data is divided and the divided portions are stored on different media.

For example, a method in which the biometrics information for a registered person is divided, each divided information portion is stored on a card and in an authentication device, and at the time of verification the divided data is read and combined, to obtain the registered biometrics data (see for example, Japanese Patent Laid-open No. 2001-067137 and Japanese Patent Laid-open No. 2002-351843), as well as a method in which each of the divided portions of biometrics information for a registered person is stored in an authentication management center and in a user terminal, and at the time of verification the divided data is read and combined, to obtain the registered biometrics data (see for example, Japanese Patent Laid-open No. 2005-122478), have been proposed.

When biometrics data is divided in this way, a key to relate the divided data is necessary. That is, a key is used to associate and to combine divided data, to reproduce the registered data at the time of verification. In the proposals of the prior art described above, an encrypted identifying number (for example, an ID number, password number or similar) of the registered person is used as the key.

However, even if the identifying number in the technology of the prior art is encrypted, the number can be decrypted. If the identifying number is decrypted, even when data has been divided in order to prevent illicit use of the entirety of the biometrics data, the corresponding divided data can easily be retrieved and combined, to reproduce the entirety of the biometrics data.

Moreover, biometrics data is individual information, and so illicit access and of course such illicit acquisition must of course be prevented. For this reason there are concerns that the security of biometrics authentication devices used by individuals may be compromised, impeding the spread of such devices; and so further measures are necessary to enable the effective use of biometrics authentication.

SUMMARY OF THE INVENTION

Hence an object of the invention is to provide a biometrics authentication method, media for individual authentication, and biometrics authentication device to prevent the illicit acquisition and merging of divided biometrics information even when biometrics information is divided and is stored on different media.

A further object of the invention is to provide a biometrics authentication method, media for individual authentication, and biometrics authentication device to prevent forgery of biometrics information even when biometrics information is divided and is stored on different media.

Still a further object of the invention is to provide a biometrics authentication method, media for individual authentication, and biometrics authentication device to prevent the illicit acquisition of biometrics information through theft of media even when biometrics information is divided and is stored on different media.

In order to attain these objects, a biometrics authentication device of this invention has a detection device, which detects a portion of interest of a body, and outputs biometrics data indicating biometrics characteristics; a database file, which stores one biometrics data portion among a plurality of data portions resulting from division of biometrics data of the user detected by the detection device; individual media for storing a biometrics information key generated from the biometrics data and another biometrics data portion which is divided; and a control unit which, at the time of authentication using the individual media, combines another biometrics data portion of the individual media with the one biometrics data portion of the database file, creates a biometrics information key from the combined biometrics data, compares the biometrics information key read from the individual media with the biometrics information key thus created, and, depending on the comparison result, verifies the combined biometrics data against the biometrics data obtained from the detection device, and performs individual authentication.

Further, a biometrics authentication method of the invention has a detection step of detecting a portion of interest of a body, and of outputting biometrics data indicating biometrics characteristics; a step of dividing the biometrics data of the user, detected in the detection step, into a plurality of portions; a step of creating a biometrics information key from the biometrics data; a step of storing one portion of the divided biometrics data in a database file; a step of writing the biometrics information key generated from the biometrics data and another divided biometrics data portion on individual media; a step of merging another biometrics data portion on the individual media with the one biometrics data portion in the database file, creating a biometrics information key from the combined biometrics data, and comparing the biometrics information key read from the individual media with the created biometrics information key; and a step of, depending on the comparison result, verifying the combined biometrics data against biometrics data obtained from the detection device, and performing individual authentication.

Media for individual authentication of the invention is individual authentication media used in individual authentication by detecting biometrics characteristics of the user for biometrics authentication, and is stored one portion of biometrics data resulting from division into a plurality of portions of biometrics data of the user, obtained by detection of the portion of interest of the user's body, and a biometrics information key, generated from the biometrics data.

In this invention, it is preferable that the control unit divide the biometrics data detected by the detection device at the time of registration of the biometrics data, registers one of the divided portions of biometrics data in the database file, and store another portion of biometrics data and the biometrics information key in the individual media.

In this invention, it is preferable that the control unit create the biometrics information key from a data area spanning the plurality of divided portions of the biometrics data.

In this invention, it is preferable that the control unit create the biometrics information key from the biometrics data and from an identification number input by the user.

In this invention, it is preferable that a media reader/writer which reads storage information from and writes storage information to the individual media, be further comprised.

In this invention, it is preferable that, when the comparison result is not a match, the control unit retrieve another one of the one biometrics data portion from the database file, combine another biometrics data portion on the individual media and the one biometrics data portion retrieved from the database file, and create a biometrics information key from the combined biometrics data.

In this invention, it is preferable that the control unit combine another biometrics data portion on the individual media and the one biometrics data portion in the database file, create a biometrics information key from the combined biometrics data, compare the biometrics information key read from the individual media with the created biometrics information key, and when the comparison result is a match, operate the detection device and obtain the biometrics data for the user.

In this invention, it is preferable that the control unit have a biometrics data management control module which combines another biometrics data portion on the individual media and the one biometrics data portion in the database file, creates a biometrics information key from the combined biometrics data, and compares the biometrics information key read from the individual media with the created biometrics information key, and a verification control module, which verifies the combined biometrics data against biometrics data obtained from the detection device and performs individual authentication.

In this invention, it is preferable that the control unit have a biometrics data management control module, which divides the biometrics data detected by the detection device, records one portion of the divided biometrics data in the database file, and stores another portion of the divided biometrics data and the biometrics information key on the individual media, and a registration control module, which operates the detection device, acquires the biometrics data, and passes the data to the biometrics data management control module.

In this invention, it is preferable that the detection device be a device which detects blood vessel images in the body.

In this invention, it is preferable that the detection device comprise an image capture unit which captures images of blood vessels in a hand of the body.

By means of this invention, a biometrics information key is created from biometrics data, biometrics data is separated into a plurality of portions, each portion is stored on different media, and the portions are linked by the biometrics information key. Therefore, even though the biometrics data is separated and stored in a distributed manner, the confidentially of the association of the separate data portions is improved, contributing to prevention of illicit use as a result of the leakage or theft of biometrics data.

DESCRIPTION OF THE PREFERRED EMBODIMENTS

Below, embodiments of the invention are explained, in the order of a biometrics authentication device, biometrics data registration processing, biometrics data authentication processing, and other embodiments.

Biometrics Authentication Device

Figure 1:
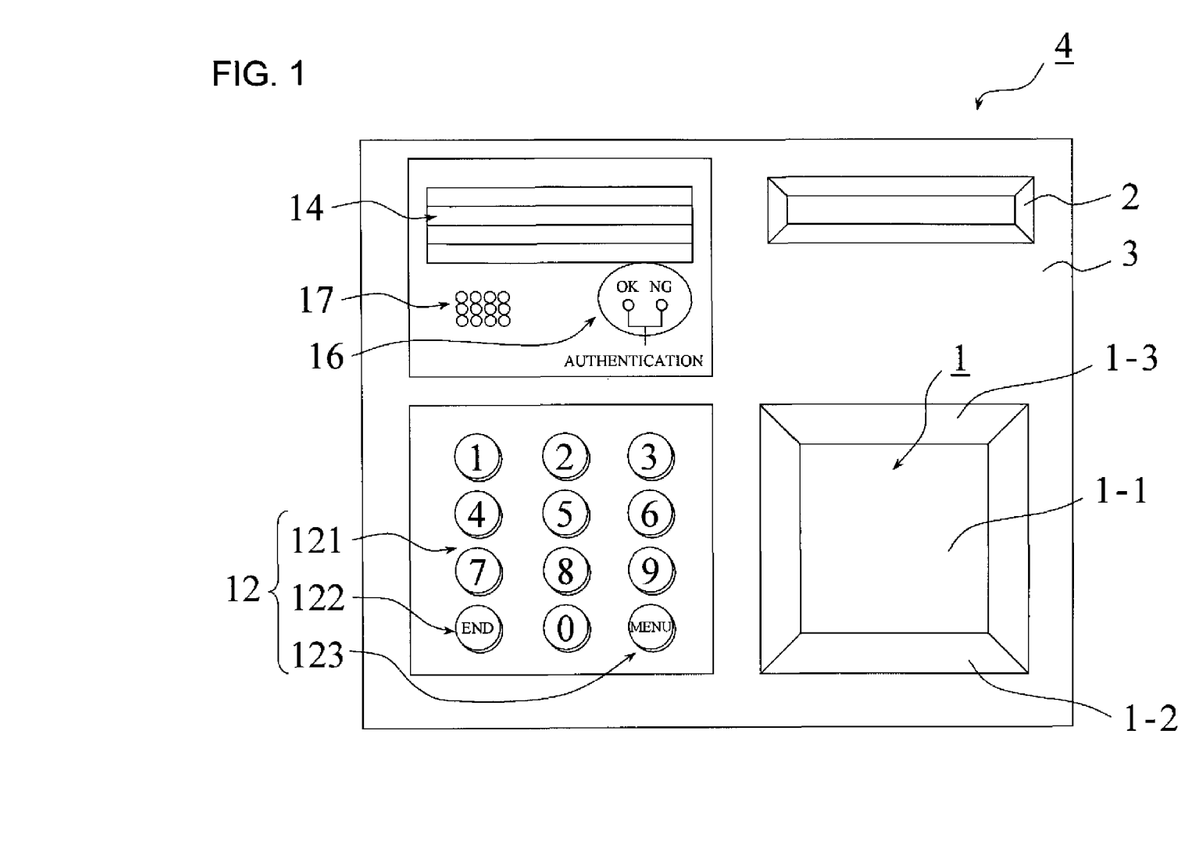
FIG. 1: Diagram of the configuration of the biometrics authentication device of one embodiment of the invention.

FIG. 1 is a front view of the biometrics authentication device of one embodiment of the invention. FIG. 1 shows an entry/leaving device employing a palm vein authentication mechanism, as a biometrics authentication device. As shown in FIG. 1, the biometrics authentication device 4 has a main board 3. On the main board 3 are provided an IC card reader/writer 2, a vein sensor (biometrics detection device) 1, a screen display 14, an authentication result display 16, a buzzer 17, and an input key group 12.

The IC card reader/writer 2 reads data from and writes data to an IC chip in an IC card (individual card) carried by the user. As explained below, this IC card stores separated biometrics data β and a biometrics information key.

The vein sensor 1 comprises a palm image capture device. The palm image capture device 1 has mounted, substantially in the center of the main unit, a sensor unit 1-1. Above and below the sensor unit 1-1 are provided a pair of guides 1-2 and 1-3. The guide 1-2 serves to support the wrist, and the guide 1-3 serves to support the fingers.

Hence the guide 1-2 provides guidance to the user so as to guide and support the wrist, and the guide 1-3 provides guidance to the user so as to guide and support the fingers. Consequently the attitude of the palm above the sensor unit 1-1, that is, the position, inclination, and size can be controlled.

The sensor unit 1-1 is provided with an infrared sensor (CMOS sensor), focusing lens and a distance sensor in the center; on the periphery thereof are provided a plurality of near-infrared light emission elements (LEDs). For example, near-infrared light emission elements are provided at eight places on the periphery, to emit near-infrared rays upwards. The CMOS sensor receives emitted light which has been reflected. A vein pattern is extracted from the captured image thus received.

The display unit 14 displays various states, such as for example guidance messages and similar. The authentication result display unit 16 uses a lamp to display the authentication result (OK, NG). The buzzer 17 uses sounds to provide notification of various states. The key group 12 has a numeric keypad 121 for input of IDs and similar, an end key 122 to give notification of the end of operation, and a menu key 123 for selection of menu items.

As explained below, in this entry/leaving system, the user inserts his own IC card into the IC card reader/writer 2 at the time of registration, and moreover holds his palm over the palm image capture device (hereafter simply "image capture device") 1, to cause a blood vessel image to be read. The main board 3 creates blood vessel image data (biometrics data) from the read-out blood vessel image, and separates this blood vessel image data, and then registers one portion of the blood vessel image data α on the main board 3, and another portion of the blood vessel image data β on the IC card. Simultaneously, the main board 3 creates a biometrics information key from the blood vessel image data and registers the biometrics information key on the IC card.

Upon entry, a user inserts his own IC card into the IC card reader/writer 2, and the IC card reader/writer 2 reads the blood vessel image data β and biometrics information key from the IC card. The user also holds his palm over the image capture device 1, causing a blood vessel image to be read. The main board 3 combines the blood vessel image data β thus read with one blood vessel image data portion α within the main board 3, creates a biometrics information key from the combined blood vessel image data, and verifies the key against the registered biometrics information key read from the IC card.

If the verification result is a match, the blood vessel image data α is judged to be associated with the blood vessel image data β on the IC card, the blood vessel image data α and the blood vessel image data β from the IC card are combined, and registered blood vessel image data (biometrics data) is created. Then, the blood vessel image data obtained from the blood vessel image read by the image capture device 1 is verified against this created blood vessel image data. If the verification result is satisfactory, the door is opened under control by the main board 3, and entry is possible.

If the verification result is not satisfactory, the main board 3 retrieves other blood vessel image data α from within the main board 3, combines the read-out blood vessel image data β with the retrieved blood vessel image data α, creates a biometrics information key from the combined blood vessel image data, and verifies the key against the registered biometrics information key read from the IC card.

If the verification result is a match, registered blood vessel image data is created, and the blood vessel image data obtained from the image capture device 1 is verified against this created registered blood vessel image data. If the verification result is a mismatch, other blood vessel image data α may similarly be retrieved from within the main board 3. And the read-out blood vessel image data β is combined with the retrieved blood vessel image data α, a biometrics information key is created from the combined blood vessel image data, and this key may be verified against the registered biometrics information key read from the IC card.

Thus at the time of registration, a biometrics information key is created from the registered blood vessel image data, and the blood vessel image data α and blood vessel image data β which had been separated from the registered blood vessel image data are associated. Hence even when separated blood vessel image data portions are stored on different media, and the blood vessel image data and information key are leaked from one of the media, or even if theft occurs, if the other blood vessel image data is not obtained, the information key cannot be obtained. Hence the efficacy in preventing illicit use through distributed management of biometrics data can be further enhanced.

Biometrics Data Registration Processing

Figure 2:
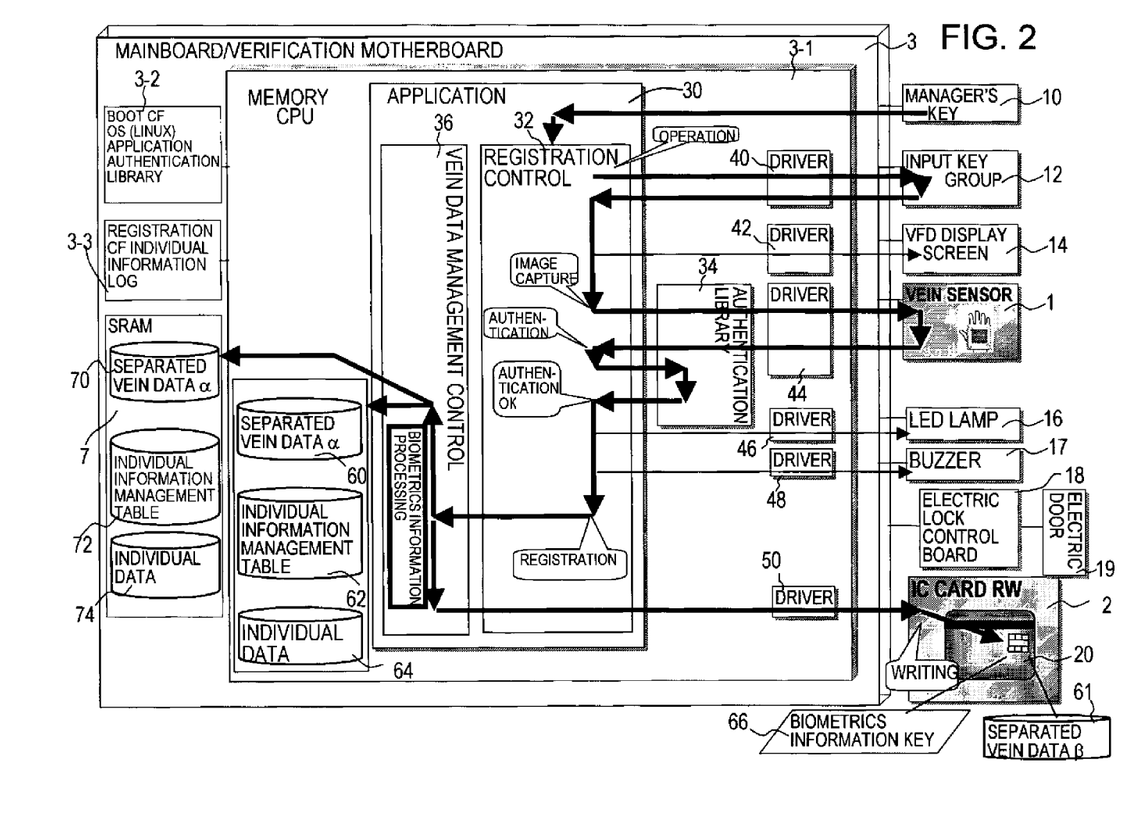
FIG. 2: Diagram of the configuration of the biometrics authentication device of FIG. 1 at the time of registration.
Figure 3:
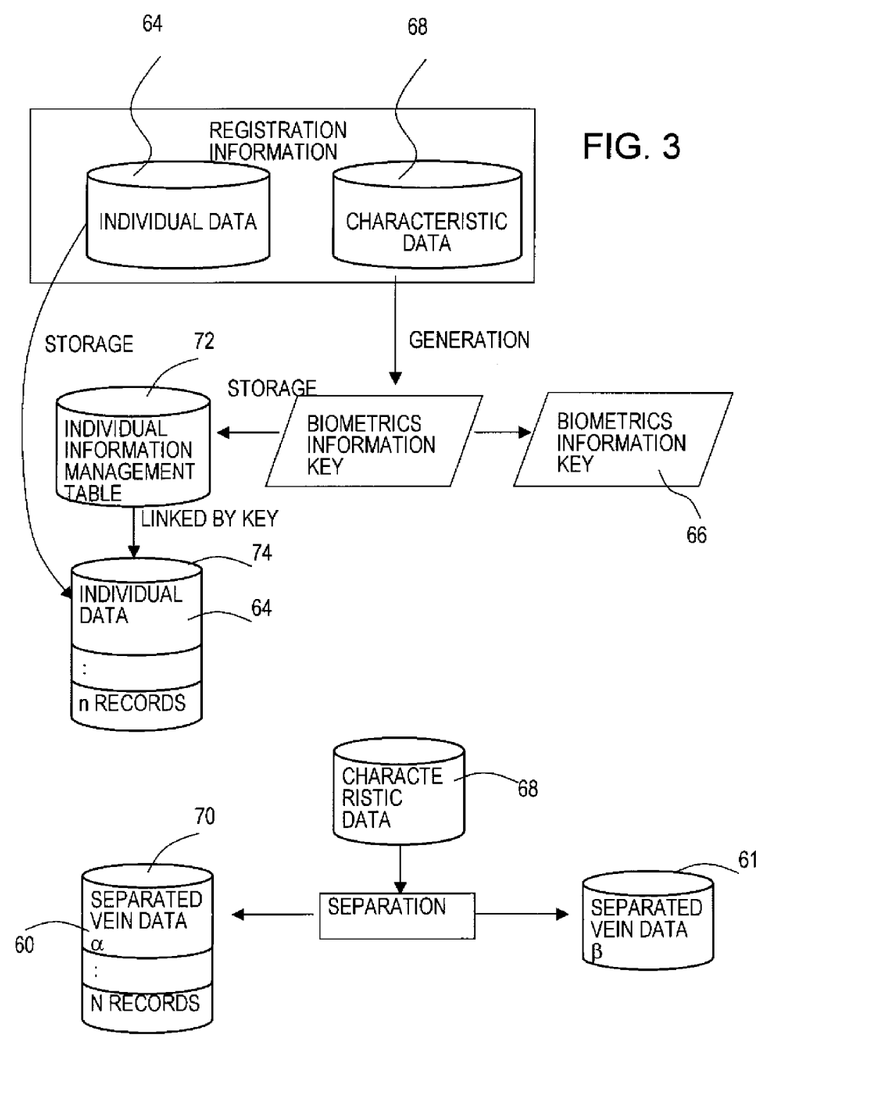
FIG. 3: Diagram explaining operation at the time of registration in FIG. 2.

FIG. 2 explains biometrics data registration in the device of FIG. 1, and FIG. 3 explains the data created. In FIG. 2, portions which are the same as in FIG. 1 are indicated by the same symbols. As shown in FIG. 2, the main board 3 has a CPU 3-1 with memory, boot memory 3-2, registration memory 3-3, and data storage memory (SRAM) 7. The boot memory 3-2 stores the OS (Operating System), an application program 30, and an authentication library (authentication program) 34.

The registration memory 3-3 is used for individual information logs. The data storage memory 7 has a biometrics table 70, which stores separated vein data α; an individual data table 74, which stores individual information; and an individual information management table 72, which stores individual information to manage the individual data table 74.

The CPU 3-1 executes the task application program 30 and authentication library 34 under control by the OS, read from the boot memory 3-2. As shown in FIG. 2, this application program 30 has a registration control program 32, a vein data management control program 36, and a verification control program 38, explained in FIG. 6.

The main-board 3 is connected to a manager's key 10 and to an electric lock control board 18 which drives opening and closing of the electric door 19. In conjunction with the application program 30 are provided a driver 40 of a numeric keypad 12, a driver 42 for the screen display 14, a driver 44 for the vein sensor 1, a driver 46 for the authentication result display (LED lamp) 16, a driver 48 for the buzzer 17 and a driver 50 for the IC card reader/writer 2.

Operation at the time of registration is explained referring to FIG. 3. First, in order to perform registration, the manager's key 10 is inserted into the main-board 3, to enable registration. The application program 30 detects the manager's key 10 and starts the registration control program 32, and a registration menu is displayed on the screen display 14.

While viewing the registration menu, the user can operate the numeric keypad of the key group 12 to input his own registration number (name, ID, department) and a registration ID. Upon receiving the registration number and registration ID, the registration control program 32 displays a registration start message on the screen display 14, and issues an image capture instruction to the vein authentication program 34. In response, the user places his hand over the vein sensor 1. The vein authentication program 34 starts the vein sensor 1, and the vein sensor 1 captures an image of the palm of the hand, and sends the captured image to the vein authentication library 34.

The vein authentication library 34 executes a series of registration and verification processing. That is, the vein authentication library 34 executes distance/hand outline detection processing, blood vessel image extraction processing, and registration and verification processing. In distance/hand outline detection processing, the distance measured by the distance sensor is received from the image capture device 1, the palm or other object is judged to be at a distance within a prescribed range from the sensor unit 1-1, and the outline of the palm is detected from the image captured by the sensor unit 1-1, and based on the outline a judgment is made as to whether the image is an image which can be used in registration and verification processing. For example, the palm may not appear adequately in the image.

In blood vessel image extraction processing, when it is judged in hand outline detection processing that an image has been captured with the hand positioned correctly, a blood vessel image is extracted from the image of the hand. That is, grayscale data is extracted from the image of the palm using differences in reflectivity, and from this blood vessel image (grayscale) data, characteristics of the blood vessel image (the directions and numbers of trunks and branches of blood vessels, and similar), determined in advance, are extracted.

Verification processing retrieves blood vessel image data, compares the blood vessel image data detected in the blood vessel image detection processing with the retrieved registered blood vessel image data, performs verification processing, and outputs a verification result. Registration processing registers the blood vessel image characteristic data.

The vein authentication library 34 extracts a blood vessel image from the image captured by the vein sensor 1, and extracts the characteristic data of the blood vessel image. The vein authentication library 34 performs image capture control and extraction of blood vessel images and blood vessel image characteristic data a plurality of times (for example, three times). And the vein authentication library 34 performs verification of the characteristic data of a plurality of blood vessel images, and if the verification results are satisfactory, notifies the registration control program 32 of the authentication OK result for the data as blood vessel image characteristic data suitable for registration.

Upon obtaining the authentication OK, the registration control program 32 uses the LED lamp 16 and buzzer 17, via the drivers 46 and 48, to provide notification of authentication OK. The registration control program 32 then sends the registration data (individual data and blood vessel image characteristic data) to the vein data management control program 36.

As shown in FIG. 3, the vein data management control program 36 receives as registration information the individual data (registration information, registration ID) 64 and the blood vessel image characteristic data 68, and creates from the characteristic data 68 a biometrics information key 66. The details of the method of creation are explained below. The vein data management control program 36 separates characteristic data 68 and creates separated vein data α (60) and separated vein data β (61).

Further, the vein data management control program 36 uses the biometrics information key 66 to create an individual information management table 72 and an individual data table 74. For example, individual data 64 is stored in the individual data table 74, and the biometrics information key 66 and the storage position thereof are stored in the individual information management table 72. The vein data management control program 36 stores the above-described separated vein data α (60) in the file 70 for separated vein data α in memory 7.

Further, the vein data management control program 36 writes the above-described biometrics information key 66 and the above-described separated vein data β (61) to the IC card 20 via the driver 50 and IC card reader/writer 2.

In this way, a biometrics information key is created from blood vessel image data, the blood vessel image data is separated into two portions, and the portions are stored on different media (the IC card 20, and memory 7 of the main-board 3) and are linked by the biometrics information key.

Figure 4:
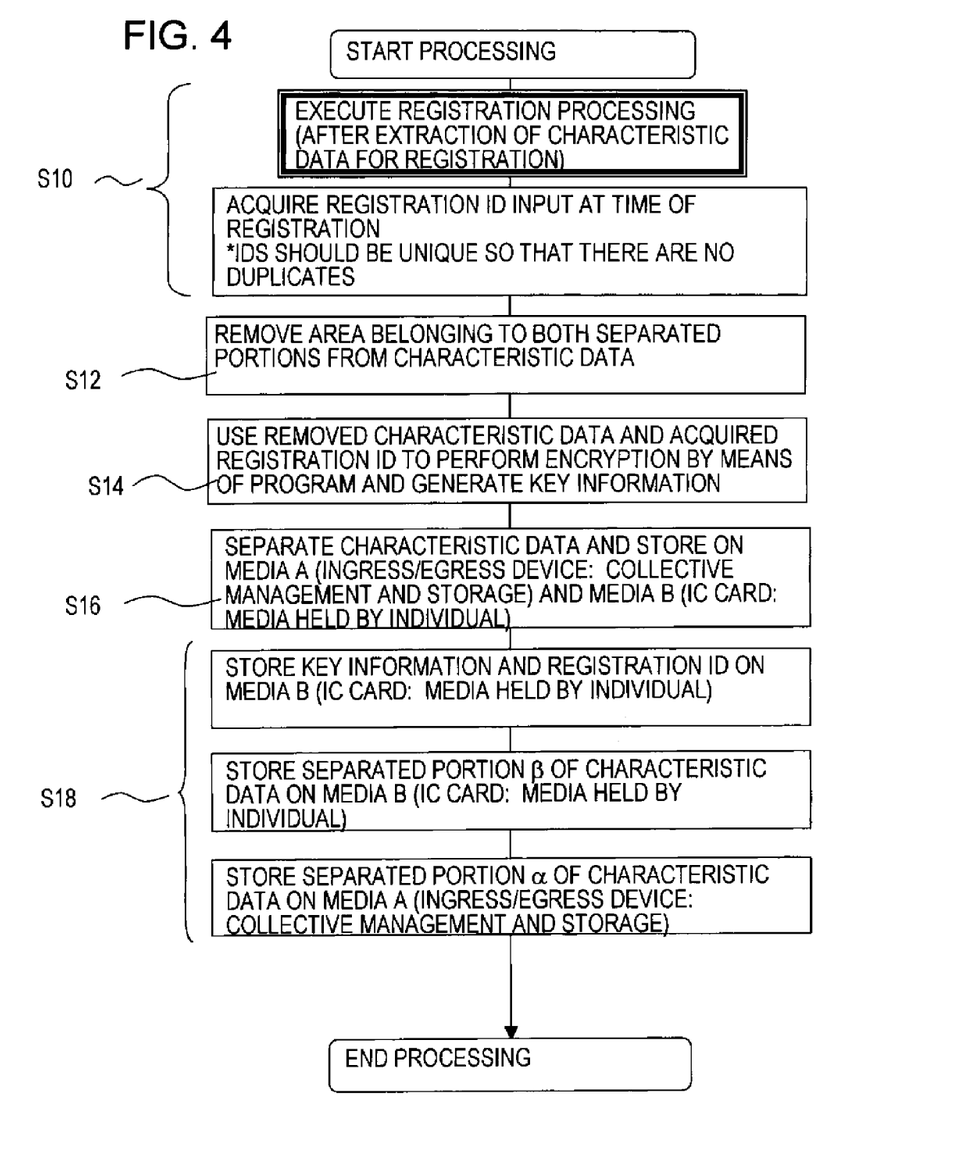
FIG. 4: Diagram of the flow of processing during registration in FIG. 2.
Figure 5:
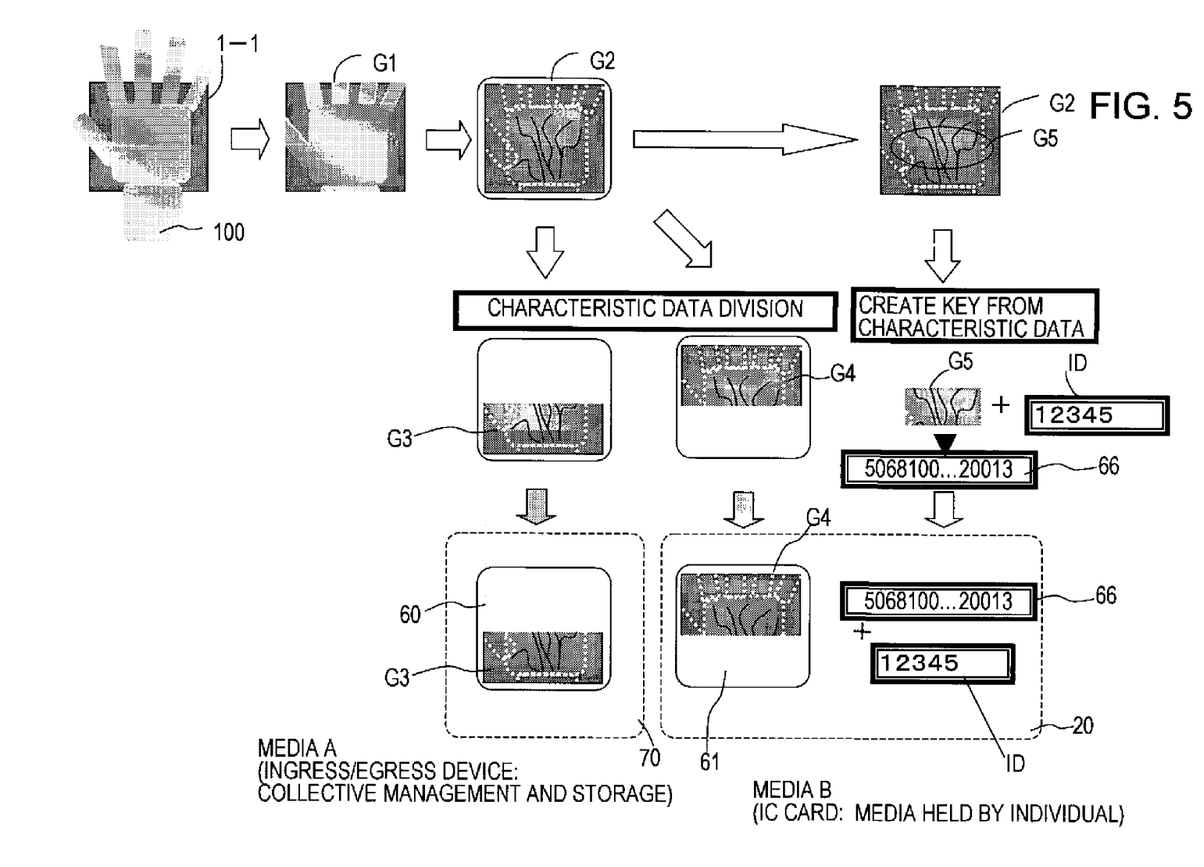
FIG. 5: Diagram explaining the registration processing of FIG. 4.

Next, registration processing by the vein data management control program 36 is explained, referring to the processing flow of FIG. 4 and the processing explained in FIG. 5.

(S10) First, the vein data management control program (hereafter called the "control program") 36 acquires registered characteristic data G2 and an input registration ID.

(S12) Next, the control program 36 cuts out a specific area G5 of the characteristic data G2. Here the data is separated into two portions, and so an area G5 belonging to both separated portions is cut out.

(S14) The control program 36 creates a biometrics information key 66 from the cut characteristic data G5 and the acquired registration ID, by means of prescribed encryption. For example, bitmap data of the area G5 of characteristic data and the registration ID are subjected to a prescribed encryption algorithm to create the biometrics information key 66.

(S16) Next, the control program 36 divides the registered characteristic data G2. Here, the registered characteristic data G2 is divided into high and low portions to create vein data α (G3) to be stored on media A (memory 7), and vein data β (G4) to be stored on media B (the IC card 20).

(S18) The control program 36 stores the biometrics information key 66, registration ID, and vein data β (G4) 61 on the media B (IC card 20). The control program 36 also stores the separated vein data α (G3) 60 on the media A (vein data file 70 in memory 7 on the main-board 3).

In this way, biometrics (here, blood vessel image) data is divided, distributed and stored, and a portion of the biometrics data is used to create an associated biometrics information key. Hence association of the divided and stored biometrics data depends on the biometrics data of the user, and so is extremely difficult to ascertain even should data be leaked.

Further, a registration ID is added to create the biometrics information key, so that decryption is made still more difficult. The biometrics information key is stored in the IC card, helping to prevent tampering and leakage of the biometrics information key.

Biometrics Data Verification Processing

Figure 6:
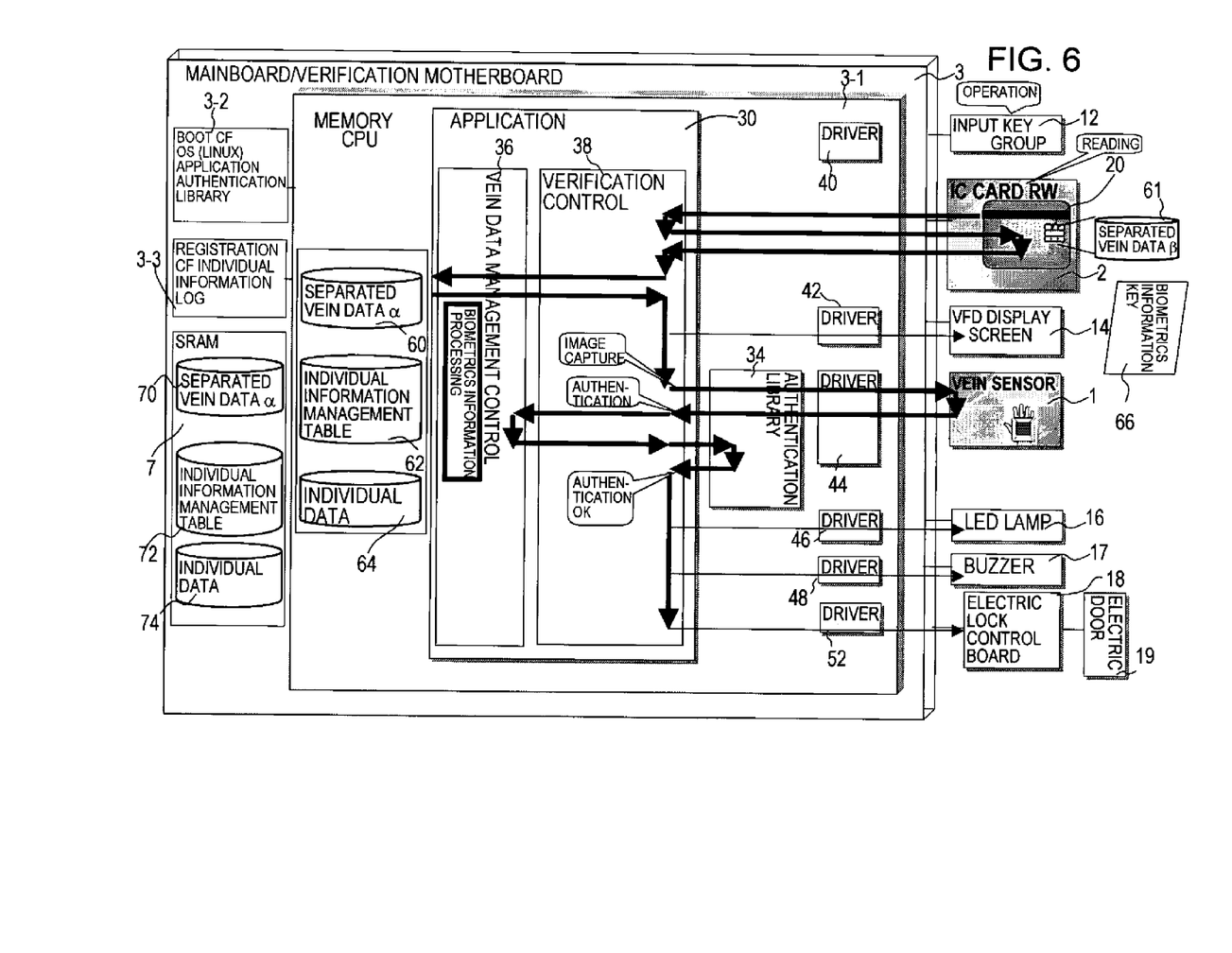
FIG. 6: Diagram of the configuration of the biometrics authentication device of FIG. 1 at the time of authentication.
Figure 7:
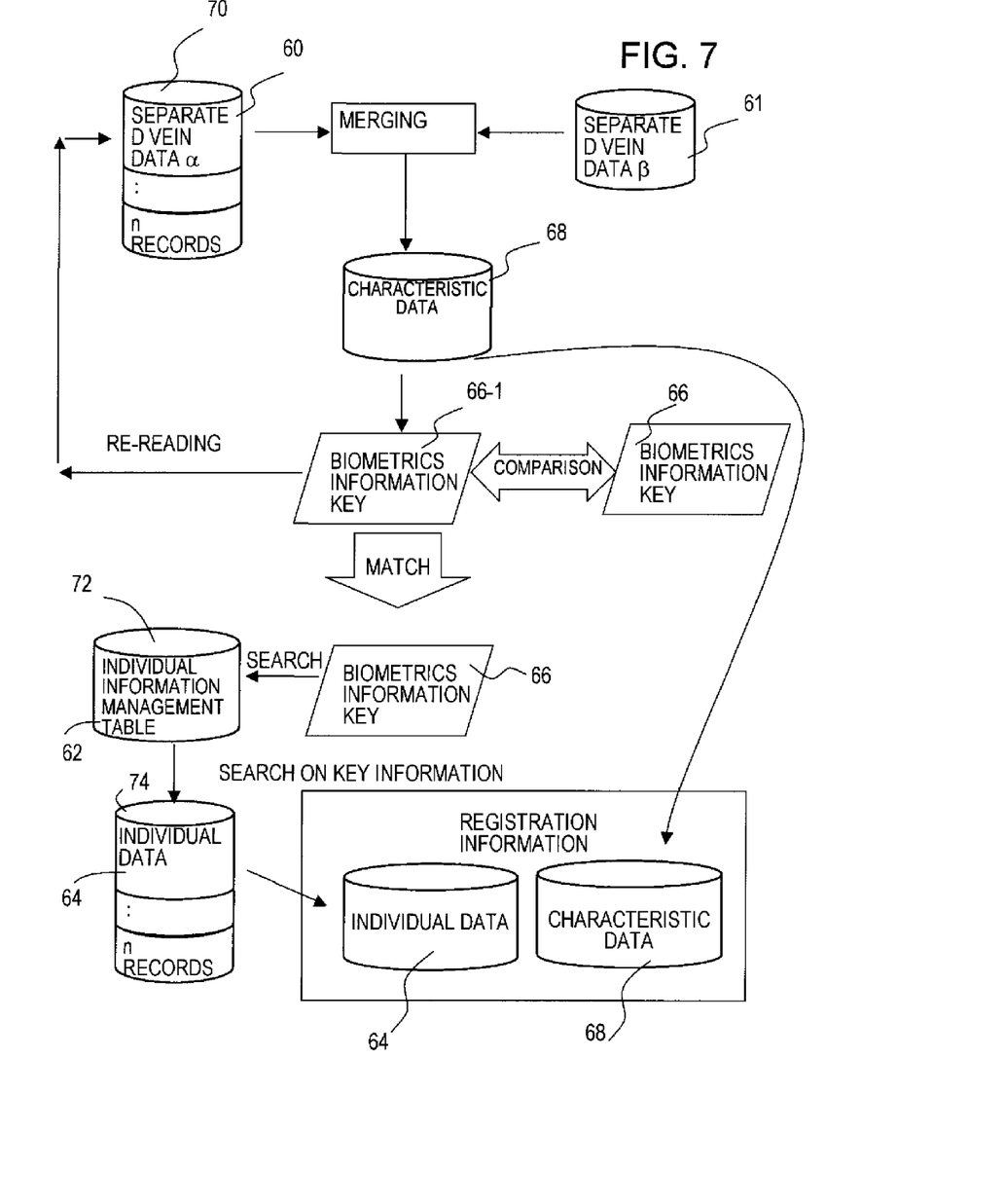
FIG. 7: Diagram explaining operation at the time of authentication in FIG. 6.

FIG. 6 explains biometrics data verification in the device of FIG. 1, and FIG. 7 explains the verification processing. In FIG. 6, portions which are the same as in FIG. 1 and FIG. 2 are assigned the same symbols. As shown in FIG. 2, the CPU 3-1 on the main-board 3 executes the task application program 30 and authentication library 34 under control of the OS read from boot memory 3-2. The CPU 3-1 executes the verification control program 38 and the vein data management control program 36.

Operation at the time of verification is explained referring to FIG. 6. First, the user inserts an IC card 20 into the IC reader/writer 2. The IC card reader/writer 2 reads the stored separated vein data β (61), biometrics information key 66, and registration ID, and sends these to the verification control program 38. Next, the vein data management control program 36 reads separated vein data α (60) from the separated vein data file 70.

As shown in FIG. 7, the vein data management control program 36 combines the separated vein data β (61) read from the IC card 20 and the separated vein data α (60) read from the file 70, and creates characteristic data 68. Then, the vein data management control program 36 creates a biometrics information key 66-1 from the above-described registration ID and characteristic data 68, by means of the above-described encryption processing.

The vein data management control program 36 judges whether the biometrics information key 66-1 thus created matches the biometrics information key 66 read from the IC card 20. If there is no match, the vein data management control program 36 reads the separated vein data α (60) stored at the next position from the separated vein data file 70, similarly combines the separated vein data β (61) read from the IC card 20 with the separated vein data α (60) from the file 70, and creates characteristic data 68. Then, the vein data management control program 36 uses the above-described encryption processing to create a biometrics information key 66-1 from the above-described registration ID and the characteristic data 68. The vein data management control program 36 judges whether the biometrics information key 66-1 thus created matches the biometrics information key 66 read from the IC card 20.

On the other hand, upon judging that the biometrics information key 66-1 thus created matches the biometrics information key 66 read from the IC card 20, the vein data management control program 36 uses the biometrics information key 66 to reference the individual information management table 62, retrieves the individual data (registration number) 64 corresponding to the individual data file 74, prepares this together with the previously created characteristic data 68 as registration information, and notifies the verification control program 38 of the completion of preparation.

The verification control program 38 displays an authentication initiation message on the screen display 14, and issues an image capture instruction to the vein authentication program 34. In response, the user places his hand over the vein sensor 1. The vein authentication program 34 starts the vein sensor 1, and the vein sensor 1 captures an image of the palm of the hand, and sends the captured image to the vein authentication library 34.

The vein authentication library 34 extracts a blood vessel image from the image captured by the vein sensor 1, and extracts characteristic data for the blood vessel image. The vein authentication library 34 notifies the biometrics data management control program 36 of the completion of extraction. The biometrics data management control program 36 sends the above-described combined characteristic data 68 to the vein authentication library 34.

As explained above, the vein authentication library 34 performs verification of the blood vessel image characteristic data obtained through image capture against the combined characteristic data, and if the verification result is satisfactory, notifies the registration control program 32 of the authentication OK result.

Upon obtaining an authentication OK result, the registration control program 32 provides notification of the authentication OK result using the LED lamp 16 and buzzer 17, via the drivers 46 and 48. The registration control program 32 then controls the electric lock control board 18 via the driver 52, enabling opening of the electric door 19. The individual data is logged in registration memory 3-3.

In this way, the blood vessel image data which has been distributed and stored is combined, a biometrics information key is created, and the newly created key is compared with the registered biometrics information key, so that even when biometrics data is distributed and stored, the secrecy of the linked relationship can be maintained.

Figure 8:
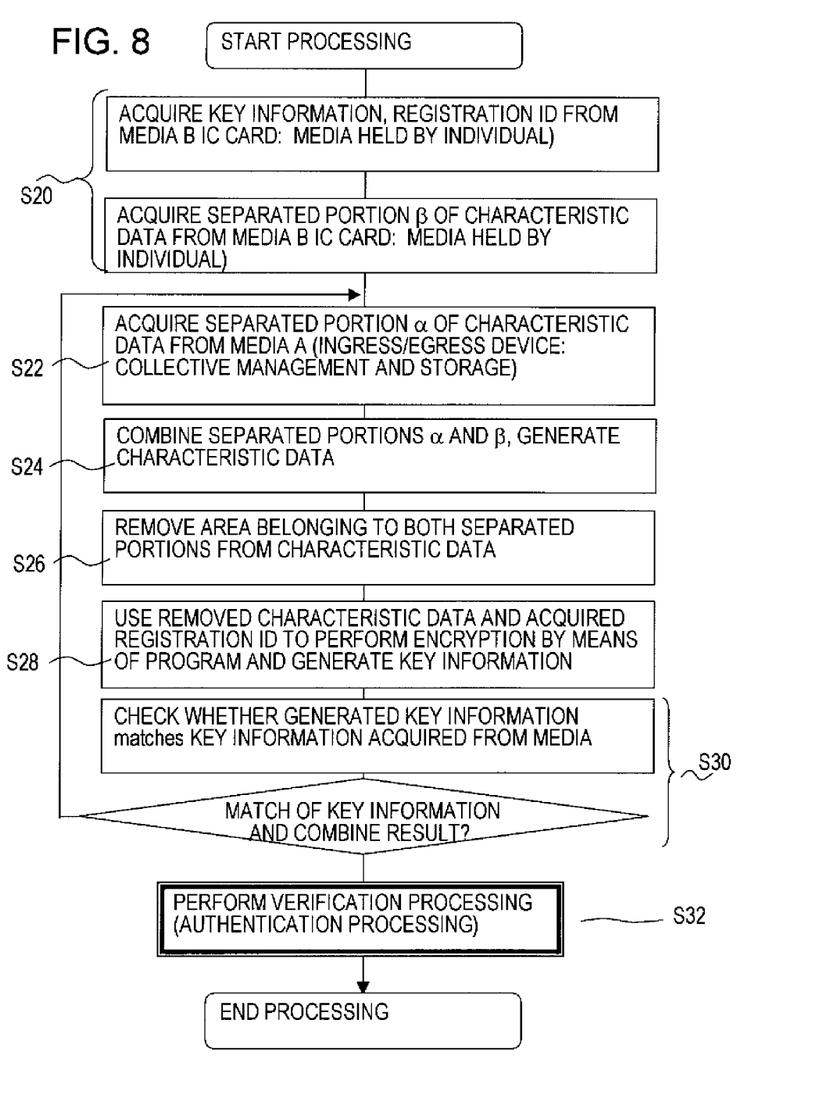
FIG. 8: Diagram of the flow of processing during authentication in FIG. 6.
Figure 9:
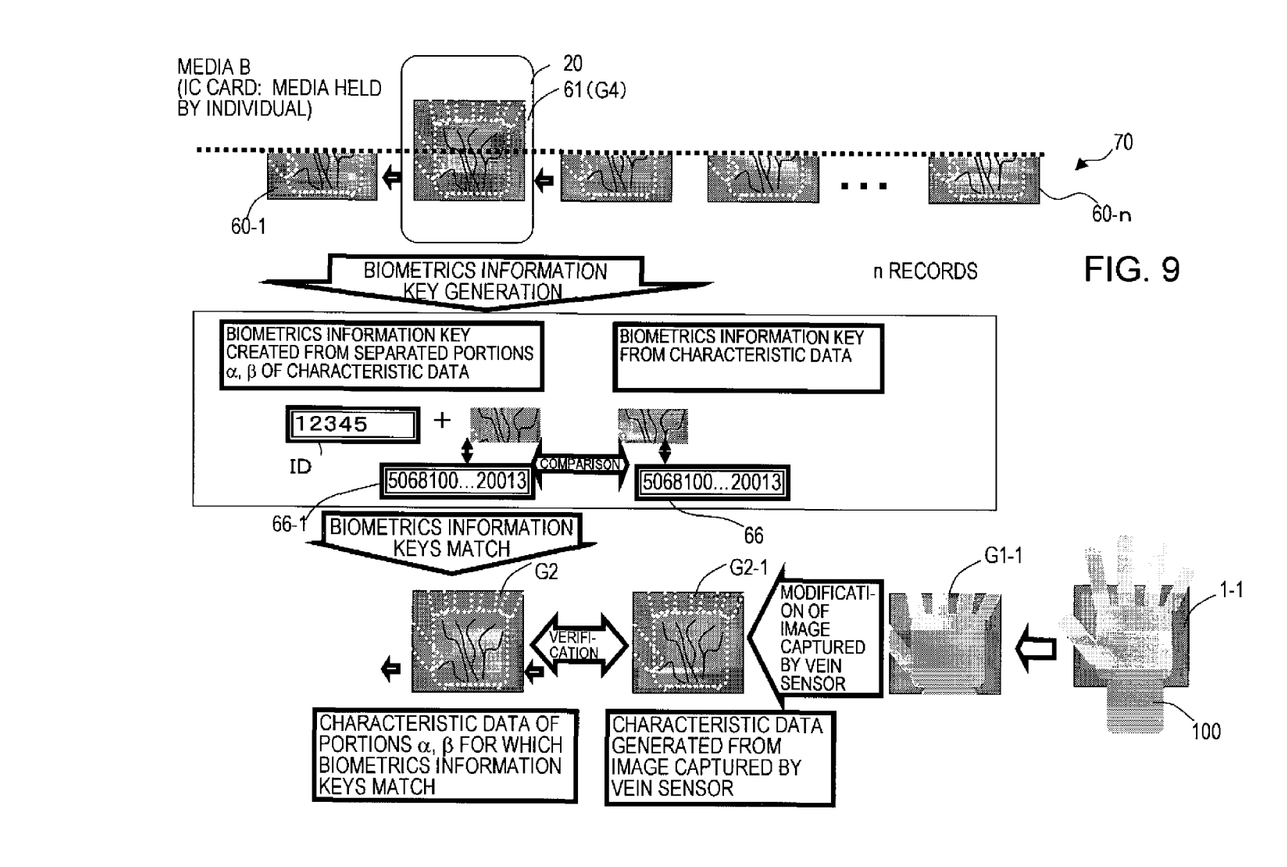
FIG. 9: Diagram explaining the authentication processing of FIG. 8.

Next, verification processing by the vein data management control program 36 is explained, referring to the processing flow diagram of FIG. 8 and the diagram explaining processing in FIG. 9.

(S20) First, the vein data management control program 36 acquires the separated vein data β (61), biometrics information key 66, and registration ID stored in the IC card 20, from the verification control program 38.

(S22) Next, the vein data management control program (hereafter called the "control program") 36 acquires the separated vein data α (60-1) from memory 70.

(S24) The control program 36 combines the separated vein data β (61) read from the IC card 20 and the separated vein data α (60-1) read from the file 70, and creates characteristic data 68.

(S26) The control program 36 cuts out a specific area G5 of the characteristic data G2. Here the data is separated into two portions, and so an area G5 belonging to both separated portions is cut out.

(S28) The control program 36 creates a biometrics information key 66 from the cut off characteristic data G5 and the acquired registration ID, by means of prescribed encryption. For example, bitmap data of the area G5 of characteristic data and the registration ID are subjected to a prescribed encryption algorithm to create the biometrics information key 66-1.

(S30) Next, the control program 36 compares the newly created biometrics information key 61-1 and the biometrics information key 66 read from the media B (IC card 20). If the comparison result is not a match, processing returns to step S22, the vein data α 60-2 at the next position is acquired, and the processing of steps S24 to S30 is executed.

(S32) If on the other hand the comparison result is a match, the control program 36 provides notification of the completion of preparation of registration information, as described above, performs image capture and verification of the characteristic data G2 against the characteristic data G2-1 obtained from the image capture result, and performs authentication processing.

In this way, biometrics data (here, blood vessel image data) is divided and distributed on different media for storage, and in addition an associated biometrics information key is created from a portion of the biometrics data. Hence the association of the biometrics data which has been distributed and stored depends on the biometrics data of the user, and so is extremely difficult to ascertain even should data be leaked.

Further, the registration ID is added to create the biometrics information key, so that decryption is still more difficult. The biometrics information key is stored on the IC card, helping to prevent tampering and leakage of the biometrics information key.

Moreover, biometrics data separation and merging, biometrics information key creation, and comparison are executed by a data management control program 36 which is not involved in registration processing or verification processing, so that secrecy can be further improved.

OTHER EMBODIMENTS

In the above-described embodiments, blood vessel image data for the palm of a hand was used as the biometrics data in explanations; however, blood vessel image for the back of the hand or the fingers may also be used. Similarly, application is also possible to fingerprints, handprints, retina images, facial features, and other biometrics data.

Moreover, division of biometrics data was explained for the case of division into high and low portions; but division may be into left and right portions, or into three or more portions. When dividing into three or more portions, a biometrics information key may be crated from a removed area which comprises three or more separated portions, or a biometrics information key may be created from a removed area comprising two separated portions.

Similarly, the biometrics information key may be created from the cut-off portion without using the registration ID, and the media for distributed storage is not limited to an IC card (individual media) and memory in the verification device, but may be a combination of two individual media units, or may be individual media and a collective management device (for example, a server connected to the entry/leaving device).

Further, examples were explained in which the separated vein data α stored in the device did not have an index; but the registration ID may be used as an index. In this case, the corresponding separated vein data α can be retrieved rapidly.

Further, fields of application are not limited to entry/leaving devices, and application to use of hotel and other facilities, to rental systems for videos, automobiles or other commodities, to uses in place of credit cards in finance and distribution areas, to reservation checking systems for train, airplane, and other transportation systems, and similar is possible.

In the above, the invention has been explained through embodiments of the invention; but various modifications to the invention can be made within the scope of the invention, and these modifications are not excluded from the scope of the invention.

A biometrics information key is created from biometrics data, the biometrics data is separated into a plurality of portions which are stored on different media, and the portions are linked by the biometrics information key, so that even though the biometrics data is separated, distributed and stored, the confidentiality of the association of the individual separated data portions can be improved, contributing to prevent illicit use due to leakage or theft of biometrics data.

What is claimed is:

1. A biometrics authentication device, which detects characteristics of a body of a user and performs individual authentication, comprising:
    a detection device, which detects a portion of interest of the body, and outputs biometrics data indicating biometrics characteristics;
    a database file, which stores one biometrics data portion divided from the biometrics data of each of a plurality of user detected by the detection device;
    an individual media for storing another biometrics data portion divided from the biometrics data of the user, and a first biometrics information key generated from a data area which covers both of the one biometrics data portion and the another biometrics data portion which is divided; and
    a control unit which, at the time of authentication using the individual media, combines the another biometrics data portion of the individual media with the one biometrics data portion of the database file, creates second biometrics information key from a data area which covers both of the one biometrics data portion and the another biometrics data portion, compares the first biometrics information key read from the individual media with the created second biometrics information key, and, when the comparison result is matched, verifies the combined biometrics data against the biometrics data obtained from the detection device, and
    wherein the control unit, when the comparison result is mismatched, retrieves second one biometrics data portion from the database file, combines the another biometrics data portion on the individual media and the second one biometrics data portion retrieved from the database file, creates a second biometrics information key from a data area which covers both of the second one biometrics data portion and the another biometrics data portion and compares the first biometrics information key read from the individual media with the created second biometrics information key.

2. The biometrics authentication device according to claim 1, at the time of biometrics data registration, the control unit divides the biometrics data detected by the detection device into one biometric data portion and another biometric data portion, creates the first biometrics information key from the one biometric data portion and the another biometric data portion, registers one biometrics data portion in the database file, and stores another biometrics data portion and the first biometrics information key on the individual media.

3. The biometrics authentication device according to claim 2, wherein the control unit creates the first and second biometrics information keys from the one biometrics data portion and the another biometric data portion and from an identification number input by the user.

4. The biometrics authentication device according to claim 1, wherein further comprising: a media reader/writer which reads storage information from and writes storage information to the individual media.

5. The biometrics authentication device according to claim 1, wherein the control unit, when the comparison result is a match, operates the detection device and obtains the biometrics data for the user.

6. The biometrics authentication device according to claim 1, wherein the control unit comprises:
    a biometrics data management control module which combines the another biometrics data portion on the individual media and the one biometrics data portion in the database file, creates the second biometrics information key from the combined biometrics data, and compares the first biometrics information key read from the individual media with the created second biometrics information key; and
    a verification control module, which verifies the combined biometrics data against biometrics data obtained from the detection device and performs individual authentication.

7. The biometrics authentication device according to claim 6, wherein the control unit comprises:
    said biometrics data management control module, which divides the biometrics data detected by the detection device, registers one portion of the divided biometrics data in the database file, and stores the another portion of the divided biometrics data and the biometrics information key on the individual media; and
    a registration control module, which operates the detection device, acquires the biometrics data, and passes the data to the biometrics data management control module.

8. The biometrics authentication device according to claim 1, wherein the detection device is a device which detects blood vessel images in the body.

9. The biometrics authentication device according to claim 8, wherein the detection device comprises an image capture unit which captures images of blood vessels in a hand of the body.

10. The biometrics authentication device according to claim 1, wherein the control unit creates the second biometrics information key from the data area which covers an intersection of the one biometrics data portion and the another biometrics data portion.

11. A biometrics authentication method of detecting characteristics of a body of a user and perform individual authentication, comprising:
- a detection step of detecting a portion of interest of the body, and of outputting biometrics data indicating biometrics characteristics;
- a step of dividing the biometrics data of the user, detected in the detection step, into one and another biometrics data portions;
- a step of creating a first biometrics information key from a data area which covers an intersection of one and another biometrics data portions resulting from division of the biometrics data;
- a step of storing one biometrics data portion of the divided biometrics data in a database file;
- a step of writing the first biometrics information key and the another biometrics data portion on individual media;
- a step of combining the another biometrics data portion on the individual media with the one biometrics data portion in the database file;
- a step of creating a second biometrics information key from a data area which covers an intersection of one biometrics data portions from the database file and the another biometrics data portion in the individual media;
- a step of comparing the first biometrics information key read from the individual media with the created second biometrics information key;
- a step of, when the comparison result is a match, verifying the combined biometrics data against biometrics data obtained from a detection device, and performing individual authentication;
- a step of, when the comparison result in the comparison step is a mismatch, retrieving second one biometrics data portion from the database file;
- a step of combining the another biometrics data portion on the individual media with the second one biometrics data portion retrieved from the database file;
- a step of repeating the steps of verifying and retrieving until verifying is successful.

12. The biometrics authentication method according to claim 11, wherein the steps of creating the first and second biometrics information keys comprise steps of creating the first biometrics information key from the one and another biometrics data portions and from an identification number input by the user.

13. The biometrics authentication method according to claim 11, wherein further comprises a step of executing reading and writing of the first biometrics information key and another biometrics data portion from and to the individual media, using a media reader/writer which reads storage information from and writes storage information to the individual media.

14. The biometrics authentication method according to claim 11, wherein further comprising a step of, when the comparison result is a match, operating the detection device and obtaining biometrics data for the user.

15. The biometrics authentication method according to claim 11, wherein further comprising:
- a step of causing a biometrics data management control module to execute the step of combining the another biometrics data portion on the individual media and the one biometrics data portion in the database file and creating a biometrics information key from the combined biometrics data and the step of comparing the biometrics information key read from the individual media with the created biometrics information key; and
- a step of causing a verification control module to execute the step of verifying the combined biometrics data against biometrics data obtained from the detection device and of performing individual authentication.

16. The biometrics authentication method according to claim 15, wherein further comprising:
- a step of causing a biometrics data management control module to execute the step of dividing the biometrics data detected by the detection device, the step of registering one biometrics data portion resulting from the division in the database file, and the step of writing the other biometrics data portion resulting from the division and the biometrics information key to the individual media; and
- a step of causing a registration control module to execute the step of operating the detection device, acquiring the biometrics data, and passing the data to the biometrics data management control module.

17. The biometrics authentication method according to claim 11, wherein the detection step comprises a step of detecting a blood vessel image using a device for detection of blood vessel images in the body.

18. The biometrics authentication method according to claim 17, wherein the detection step comprises a step of detecting a blood vessel image using an image capture unit to capture images of blood vessels in a hand of the body.

* * * * *